March 10, 1959 E. W. BOLLMEIER 2,877,288
SPLICE-PROTECTOR
Filed Sept. 30, 1955
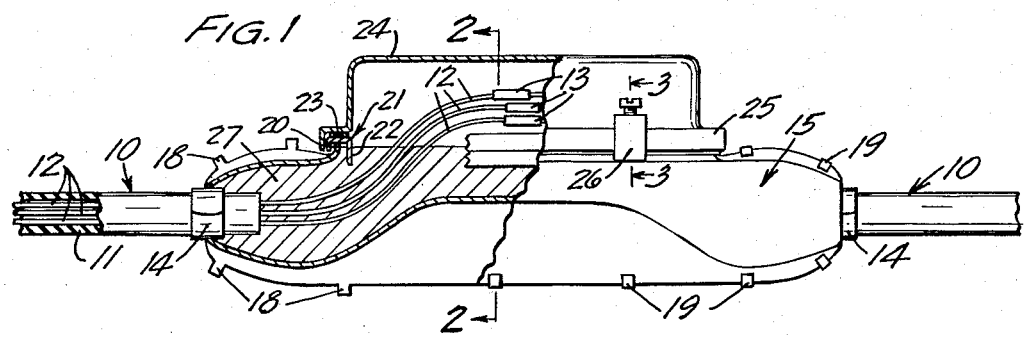
FIG. 1
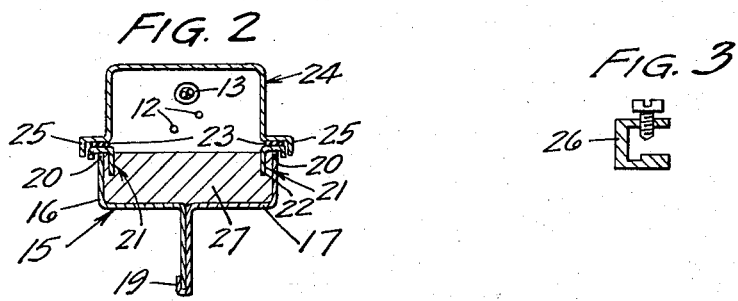
FIG. 2
FIG. 3
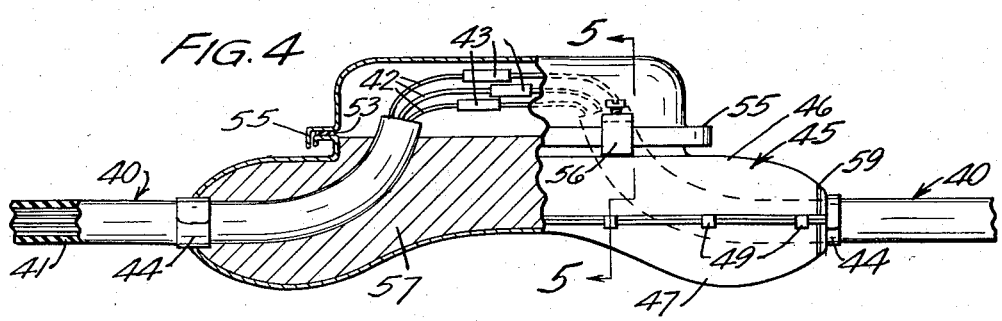
FIG. 4
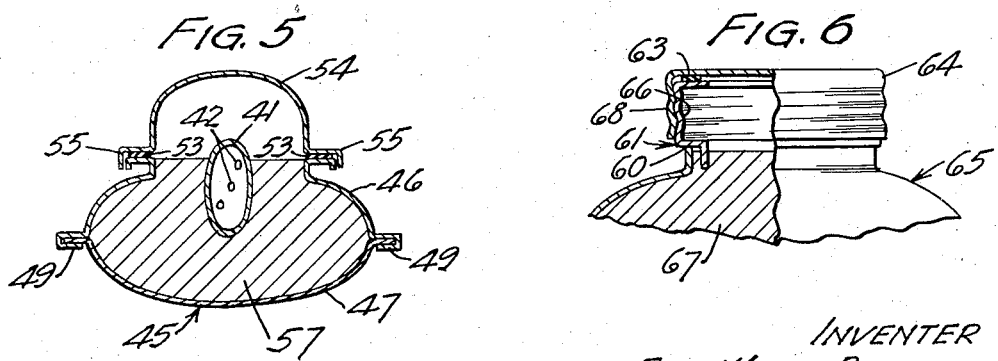
FIG. 5    FIG. 6
INVENTER
EMIL WAYNE BOLLMEIER
BY
Carpenter, Abbott, Coulter & Kinney
ATTORNEYS

United States Patent Office 2,877,288
Patented Mar. 10, 1959

2,877,288

SPLICE-PROTECTOR

Emil Wayne Bollmeier, Mendota Township, Dakota County, Minn., assignor to Minnesota Mining & Manufacturing Company, St. Paul, Minn., a corporation of Delaware Application September 30, 1955, Serial No. 537,854

2 Claims. (Cl. 174—92)

This invention relates to the enclosing and protecting of splice areas in insulated electric cables, and has particular pertinency to the covering of splices in telephone cables carrying a large number of pairs of conductors. The invention makes possible the provision of hermetically sealed coverings which may easily be opened for inspection or change and then re-sealed. The tensile strength of the splice area is ordinarily greater than that of the cable itself. A wide variety of connections, as well as auxiliary equipment, may be incorporated. The completed splice assembly is compact, neat in appearance, and fully resistant to all normal weathering and exposure. Assembly is simple and rapid, requiring no special tools or equipment.

These and other advantages are obtained, in accordance with the principles of the present invention, by employing components and methods as will now be described in connection with the accompanying drawing, in which:

Figure 1 is a side elevation of a preferred form of the splice protector as applied to a blocked-off splice area in a multi-conductor telephone cable, and is partially in cross-section;

Figure 2 is a section of the assembly of Figure 1 taken along line 2—2 as therein indicated;

Figure 3 is a section of the clamp assembly indicated in Figure 1;

Figure 4 is a side elevation, partly in cross-section, of an alternative form of splice-protector as applied to a splice area in a gas-filled cable;

Figure 5 is a section, taken at line 5—5, of the assembly of Figure 4; and

Figure 6 is a side elevation, partly in cross-section, of a portion of still another form of splice-protector.

Figure 1 illustrates a protected splice or joint between two sections of a cable 10 consisting of a bundle of individually insulated conductors 12 in an external tubular sheath 11. For convenience in illustration, only a restricted number of conductors is shown. The connections between the individual conductors are separately insulated by shields 13, which may consist of individual insulating tubes, wrappings of adhesive tape, or other well known means. The bundle of shielded spliced conductors may be, and usually is, wrapped with an insulating film or tape for further protection and convenience.

A strip of plastic filler material is wound around the cable sheath near the ends to form gaskets 14 at both ends of the splice area. The plastic material is applied under slight tension and this, together with pressure provided by the external shell of the protector device, desirably serves to constrict the sheath 11 around the bundle of conductors 12.

The external shell or casing of the protector device 15 comprises two opposite halves 16 and 17, indicated in Figure 2, which fit together to form at the central area an open raised flat portion and at each end area a terminally constricted tubular portion, the circular opening of which is designed to fit closely around gasket 14. The two halves 16 and 17 are supplied with edge fins forming a tight joint between the two. Portions of the fins of one of the halves, here illustrated in connection with the side 17, are extended to form small tabs 18 which are folded over the adjacent portion of the opposing side piece 16, as illustrated at 19, to retain the two halves in assembled position around the splice area.

The top portion of the enclosure provided by the two halves 16 and 17 is in the form of an open channel or access area, from which the conductors 12 emerge. The edges 20 of this open channel are covered with a molded seamless seating ring 21 having an inner skirt 22 falling well below the upper edge 20 of the open channel. A ring gasket 23 fits around the flat upper portion of the ring 21.

The completed assembly also includes a cap section 24 having an extended rim section 25 fitting over the ring gasket 23 and held in place thereon by a series of fasteners 26, here illustrated as screw clamps. Spring clips are also effective; or the cover may be held in place by taping it to the shell with elastic adhesive tape applied under tension around the entire assembly.

In assembling the splice protector, after the gaskets 14 have been applied and the two halves 16 and 17 of the divided shell 15 have been fastened in place, the spliced conductors with their shielding members 13 are held above the edges 20 of the assembled shield and the latter is then filled with a suitable self-hardening potting compound. Alternatively the free ends of the conductors may be pulled back over the adjacent portions of the open channel until after the potting compound has been poured into the assembly and permitted to harden, the ends being spliced together and insulated. The liquid potting compound flows between and around the several conductors within the end of the shield 11 and up to or slightly beyond the internal section of the cable surrounded by the gasket 14, and additionally fills the shell 15 to a point above the bottom edge of the skirt portion 22. The compound is permitted to harden, forming the hard adherent filler 27, and the gasket 23 and cover 24 are then applied and fastened in place. The splice area is thus entirely isolated from the open interior of the cables 10 and from atmospheric contamination.

The cover 24 is held firmly in place against the gasket 23 and on the ring 20 by means of the clamps 26, which may be screwed onto the assembly under whatever tension may be required to obtain a completely hermetic seal.

Although asphaltic, waxy, and other materials are useful under some conditions, the liquid epoxy resins have been found to give best results as potting compounds in these splice protector assemblies. These resins are strongly adherent to several types of surfaces encountered, possess excellent electrical and mechanical characteristics in hardened form, and may be applied in thin liquid form which then rapidly sets and cures without baking and without the liberation of volatile by-products.

One such liquid self-hardening compound which has given particularly desirable results in terms of high initial fluidity, rapid cure, firm adherent bond to all contacted surfaces, high mechanical and electrical strength, and superior resistance to penetration by water or water vapor, consists of a mixture of liquid epoxy resin with a minor proportion of a liquid mixture of reagents reactive therewith and comprising liquid polythiopolymercaptan polymer and liquid polyamine. The epoxy resin is a reaction product of a bisphenol and epichlorohydrin, and has free epoxy groups in the molecule. "Epon" resin No. 562 is a typical commercial example; and "Thiokol" polymer LP-2 is a commercial example of a suitable liquid polythiopolymercaptan polymer. Polyamines such as 2,4,6-tri(dimethylaminomethyl) phenol are effective activators for these compositions. The several components may be separately measured and all combined at the same time. More desirably, the amine and the polysulfide polymer are separately mixed together, and this mixture is combined with the epoxy resin just prior to pouring the composite around the splice. Mixing is conveniently accomplished in a flexible plastic bag, from which the mixture is poured directly into the open spout of the splice-protector as previously described.

The presence of the ring 21 around the divided upper edge 20 of the casing 15 during the introduction of the self-hardening potting compound is significant in the production of a hermetically sealed enclosure. Regardless of how closely the two halves 16 and 17 of the casing 15 may fit together at the upper edge, it has been found to be impossible to prevent ultimate entrance of atmospheric moisture or other corrosion inducing influences through such shields into the space beneath the cover 24. The present invention provides for the effective complete sealing of such areas.

The size of the cap portion 24 as illustrated in the drawing is sufficient only to enclose the splice areas 13 and adjoining portions of the conductors 12, together with any incidental additional wrapping, insulating, or tying means. It will be apparent, however, that caps of other sizes and shapes, and containing various other components or devices as desired, may readily replace the cap 24 while still providing for equally hermetic sealing of the entire area. Relay devices, test boards, terminal posts, and various other analogous components may thus be included within the covered space, which accordingly may properly be designated broadly as an inspection area. Where necessary, means for dehydrating the enclosed atmosphere or for otherwise preserving the effectiveness of the enclosed electrical junctures from corrosive materials normally present in the enclosed air may also be included.

The plastic filler strip material employed in producing the gasket 14 may be made by homogeneously blending the following materials in the proportions indicated:

| | Parts by weight |
|---|---|
| Butyl rubber | 100 |
| Polyisobutylene | 10 |
| Polyethylene | 12 |
| Diatomaceous earth | 60 |
| Heavy paraffin oil | 34 |
| Compatible tackifier resin | 8 |
| Carbon black | 5 |

The mixture is then extruded in a strip approximately one-eighth inch thick and of any desired width, to provide a tape product which is soft and plastic and may be molded in place around the cable, and which is self-adherent as well as adherent to the insulated surface, so as to provide a well-bonded, compact and dense gasket member.

Other compositions having analogous properties may replace the plastic gasket composition above-identified, and such materials may be applied in the form of putty or dough rather than as pre-formed tape. However the last-named modification affords the greatest convenience and is preferred for this application.

The raised portion at the central area of the casing 15 beneath the open channel area serves to reduce the total volume of potting compound required to fill the open interior of the casing, and is therefore particularly important where relatively high-priced or strongly exothermic reacting potting compounds are employed.

Ordinarily the two halves 16 and 17 of the shell or casing member 15 provide a sufficiently liquid-tight structure when held together by folded edge tabs 19 as indicated in the drawing. If necessary, however, suitable gasket material may be placed between the opposing fin or edge areas to provide a more effective seal, and other means, such as screws or spring clamps, may be provided to hold the two segments tightly together.

The soft gaskets 14 are likewise effective in providing liquid-tight seals between the surfaces of the sheathed cable 10 and the edges of the constricted open conical ends of the casing 15; but other means of forming a tight joint are equally applicable. For example, the edges of the open ends may be extended to provide a short tubular area with which greater contact with the gasket 14 on the cable surface may be obtained, and such tubes may be further sealed to the cable surface by winding with one or more turns of plastic insulating adhesive tape.

The alternative structure illustrated in Figures 4 and 5 comprises a longitudinally divided external shell 45 having an upper and a lower section 46 and 47 held together along side seams by folded tabs 49. A cover 54 is fastened over the open exposed splice area provided at the upper part of section 46. A gasket 53 is placed between cover 54 and upper section 46, as indicated, and the two members are held together by clamps 56.

As in the device of Figure 1, the open conical end portions of the assembled splice-protector fit over plastic gaskets 44 placed around the external sheath 41 of the cable 40. However as here illustrated the gaskets are placed sufficiently far from the open ends of the sheath members so that the latter may be bent upwardly and above the level of the upper edge of the upper section 46. The stiffness of the conductors 42 is ordinarily sufficient to hold the cable and its sheath in the bent position while the conductor ends are spliced together and covered with shields 43, and while the self-hardening liquid potting compound is poured into the assembly and permitted to harden. In this instance it will be observed that the interstices within the cable do not become blocked by the hardened resin. The system is particularly applicable for use with gas-filled pressurized cables, since the gas is thus permitted to flow along the interstices in the cables and to surround the splice assembly as desired.

The hardened resinous composition 57 adheres well to the interior of the protector assembly and to the cable sheath 41, but in the type of assembly illustrated in Figure 4 does not contact the conductors 42. Hence this type of assembly is not as effective as is that of Figure 1 in maintaining the full tensile strength of the cable across the splice.

It will be apparent that either type of connection may be made with either of the splice-protector units illustrated.

The shell 45 is illustrated as being provided with an additional scored ring 59 at which a further section of the conical end portion is readily removable to provide a close fit on larger cables as desired. It will be apparent that structures having oval rather than circular terminal openings may similarly be provided for application to pairs of cables, for example in making a Y splice between a single cable and a parallel pair of cables.

The structure of Figure 4 eliminates the necessity for the ring 21 employed in the structure of Figure 1, by directly providing a continuous upper edge around the inspection opening. However the section 46 of shell 45 is much more difficult to form, for example by molding or pressing of aluminum sheet material, and hence the vertically separated and easily formed sections 16 and 17 of Figure 2 are preferred over the horizontally separated sections 46 and 47 of Figure 5.

In the above described protector devices the removable cap members have been illustrated as fitting over an oval opening in the protector shell. Circular openings are also valuable in many cases, and one way of applying a circular cap section to such a shell having the general structure of that of Figure 1 is illustrated in Figure 6. The upper, and in this case circular, edge 60 of the shell opening is fitted with a circular ring 61 having a skirt portion falling within the shell opening and an extended threaded portion 66 lying above the edge 60. The upper edge of the threaded portion is turned inwardly to provide a ledge on which a circular gasket 63 is placed, and the cap 64, having a threaded rim portion 68, is then screwed over the ring and against the gasket. The hardened resinous filler 67 fills the external shell 65 to a level below the edge 60 but above the lower edge of the skirt portion of the ring 61.

The entire body of the splice protector is conveniently produced from thin sheet aluminum to provide an assembly which has adequate weather-resistance and is pleasing in appearance. This material is readily drawn into the shapes indicated in Figure 1, or, with somewhat more difficulty, into those of Figure 4; or the metal may be cast or otherwise formed into the required shapes. However various other materials of construction, including other sheet metal and various plastic or resinous materials are also useful. With some of these modifications, other systems of gasketing the cover and ring members and of clamping these two members together may be necessary due to differences in the physical properties of the materials employed, but such differences and means for overcoming them will be apparent to those skilled in the art on consideration of the functions and requirements here indicated.

Clamping means, useful with shielded cables for connecting the ends of the shielding members to the metal shell or to each other for providing continuous shielding of the conductors, may be incorporated in the reopenable splice-protector devices of this invention. The cover member may contain a transparent window section or be wholly constructed of transparent material if desired in order to provide for inspection of the protected interior. Other additions and modifications may be made without departing from the inventive concept involved and as here defined. There is provided a splice-protector unit which may be applied to insulated electric cables as a protector for spliced areas, test instruments, switch or relay components, etc., and which effectively protects such items from external exposure while at the same time providing ready access thereto and as frequently as may be desired.

What I claim is as follows:

1. A reopenable splice protector suitable for providing a hermetically sealed paotective enclosure around an inspection area in an externally sheathed insulated electric cable, comprising: a vertically longitudinally divided multiple section casing member having an open upper channel area bounded by rim portions from a plurality of said multiple sections; a seamless ring member fitting over said rim portions to provide a continuous rim and having a continuous skirt portion extending below the edge of said upper channel area; and a cover member having a corresponding continuous rim and capable of being hermetically removably sealed thereagainst.

2. A reopenable splice protector suitable for providing a hermetically sealed protective enclosure around an inspection area in an externally sheathed insulated electric cable, comprising: a longitudinally divided multiple section casing member having open terminal portions closely fitting around said sheathed cable at both sides of said inspection area and having an open upper channel area having a continuous rim; a cover member having a corresponding continuous rim and capable of being hermetically removably sealed against the continuous rim of said open upper channel area; and external clamping means for sealing said cover member against the continuous rim of said channel area.

References Cited in the file of this patent

UNITED STATES PATENTS

| 416,143 | Wesslau | Nov. 26, 1889 |
| 522,664 | Kleinsteuber | July 10, 1894 |
| 1,496,632 | Herbst | June 3, 1924 |
| 1,862,811 | Strong | June 14, 1932 |

FOREIGN PATENTS

| 517,446 | France | Dec. 7, 1920 |
| 243,834 | Great Britain | Dec. 10, 1925 |

OTHER REFERENCES

"Ethoxylines" (Preiswerk et al.), published in Modern Plastics, November 1950 (pages 85–88 relied on). (Copy in the Scientific Library and Div. 69, class 174–52.6.)